No. 880,105. PATENTED FEB. 25, 1908.
J. J. SHIMEK.
GRATE FOR COOK STOVES.
APPLICATION FILED MAY 24, 1906.
2 SHEETS—SHEET 1.
Fig. 1.
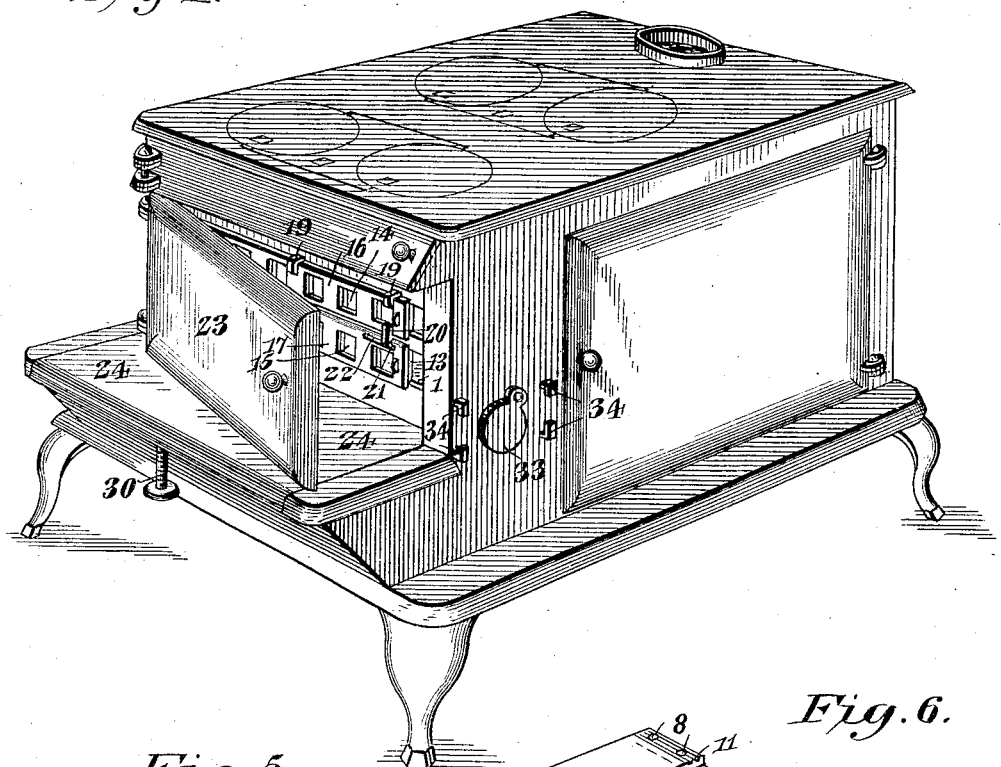
Fig. 5.
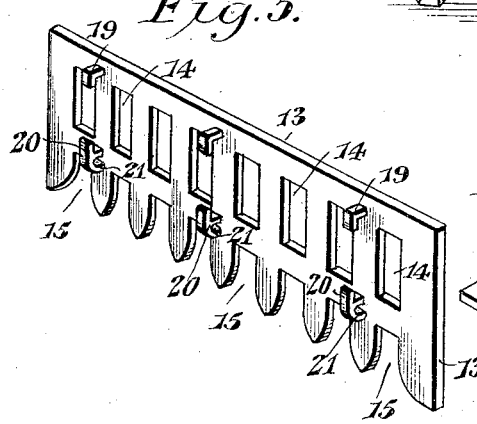
Fig. 6.
Fig. 7.
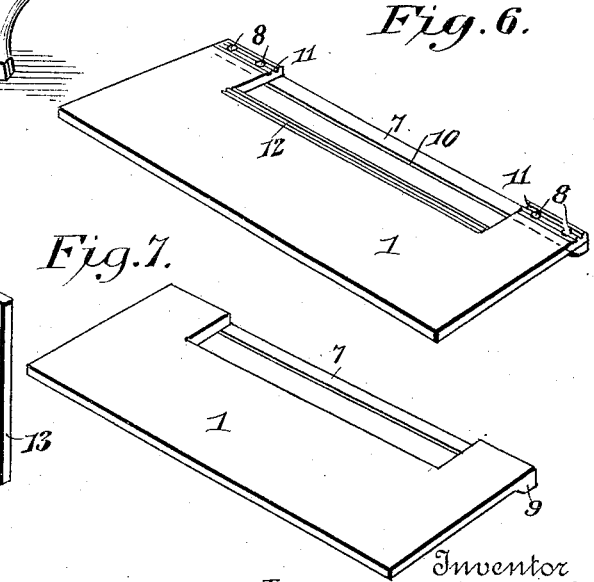
Witnesses
Jas. F. McCathran
H. F. Riley
Inventor
Joseph J. Shimek,
By C. G. Siggers
Attorney
THE NORRIS PETERS CO., WASHINGTON, D. C.

No. 880,105. PATENTED FEB. 25, 1908.
J. J. SHIMEK.
GRATE FOR COOK STOVES.
APPLICATION FILED MAY 24, 1906.
2 SHEETS—SHEET 2.
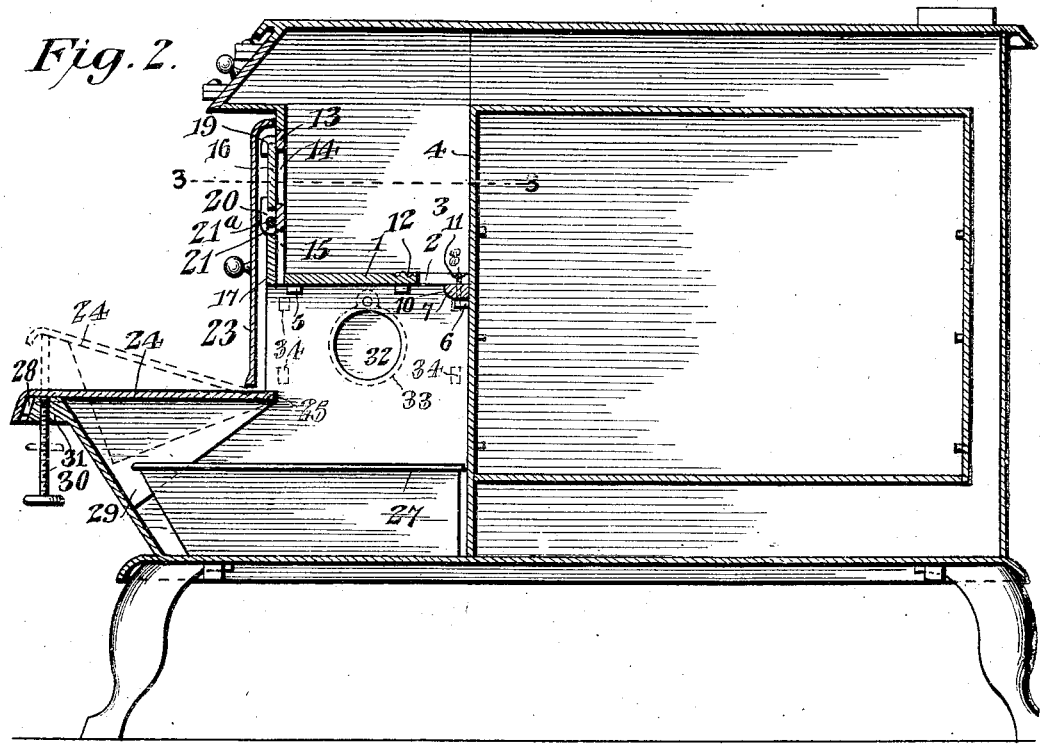
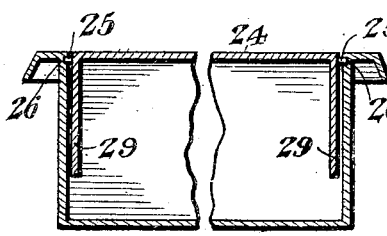
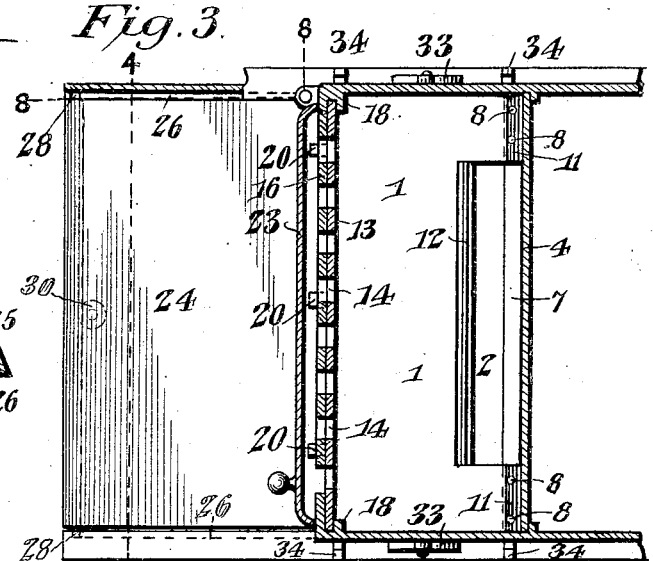
Joseph J. Shimek, Inventor
Witnesses
Jas. K. McCathran
W. W. Riley
By E. G. Siggers
Attorney

UNITED STATES PATENT OFFICE.

JOSEPH J. SHIMEK, OF CUBA, KANSAS.

GRATE FOR COOK-STOVES.

No. 880,105.　　　Specification of Letters Patent.　　　Patented Feb. 25, 1908.

Application filed May 24, 1906. Serial No. 318,501.

*To all whom it may concern:*

Be it known that I, JOSEPH J. SHIMEK, a citizen of the United States, residing at Cuba, in the county of Republic and State of Kansas, have invented a new and useful Grate for Cook-Stoves, of which the following is a specification.

The invention relates to improvements in grates for cook stoves.

The object of the present invention is to improve the construction of cook stoves, and to provide means for controlling the heat, whereby more advantageous cooking is afforded and a material saving in fuel is effected.

A further object of the invention is to simplify and lessen the cost of constructing cook stoves, and to increase the durability of the same.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a cook stove constructed in accordance with this invention. Fig. 2 is a longitudinal sectional view of the same. Fig. 3 is a horizontal sectional view taken substantially on the line 3—3 of Fig. 2. Fig. 4 is a detail sectional view on the line 4—4 of Fig. 3. Fig. 5 is a detail perspective view of the front grate. Fig. 6 is a similar view of the bottom grate. Fig. 7 is a perspective view, illustrating a slight modification of the bottom grate. Fig. 8 is a sectional view taken substantially on the line 8—8 of Fig. 3, and illustrating the manner of mounting the adjustable hearth.

Like numerals of reference designate corresponding parts in all the figures of the drawings.

The improvements herein shown and described are applicable to all kinds and styles of cook stoves and enable the draft and the heating effect of the same to be controlled by the operator. The cook stove illustrated in the accompanying drawings is equipped with an oven, which is spaced from the top of the stove to provide a rearwardly extending top flue. The bottom grate 1, which may be constructed of any suitable material, consists of an imperforate body portion extending rearwardly from the front edge of the grate to a rear opening 2, located at the back of the grate 1 and extending from the center toward each end of the grate and terminating short of the said ends thereof. The grate 1 extends across the space between the front of the stove and the oven, and it constitutes the bottom of the fire box. By this arrangement the draft from the bottom of the stove passes upward at the back of the fire box 3 and operates to retain the heat within the fire box by preventing the same from being carried off quickly by the draft, when the stove is arranged to afford a straight draft from the fire box to the stove pipe.

Any suitable arrangement of flues and dampers for either affording a straight draft from the fire box to the stove pipe, or for causing the products of combustion to pass around the oven may be employed, and as these features do not constitute any portion of the present invention, detail description and illustration thereof are deemed unnecessary.

Besides operating to retain the heat within the fire box, the upward draft at the back of the fire box modifies the heat at the rear wall 4 sufficiently to obviate the necessity of lining the same with brick in order to prevent the rear wall from burning out. Furthermore by providing the rear draft opening and the front imperforate body portion of the grate, the bulk of fuel lies upon the imperforate body portion and is retained in the fire box until thoroughly consumed.

The rear opening 2 terminates short of the ends of the bottom grate, and the latter is supported by means of suitable lugs 5 and 6, preferably cast integral with the stove, but any other desired support may be provided. The grate is provided with a rear deflecting portion 7, located at the back of the opening 2 and beneath the plane of the body portion of the bottom grate. The deflecting portion 7, which is in the form of a bar, connects the end portions of the grate at the said opening 2 and it may be secured at its ends to the lower face of the grate by means of rivets 8, as illustrated in Fig. 6 of the drawings, or it may be cast integral with the grate, as shown at 9 in Fig. 7 of the drawings. The deflecting portion 7 is provided with a beveled front edge or face 10, which extends upwardly and forwardly from the lower face of the bar or portion 7 for directing the current of air, which passes through the bottom opening 2 of the grate, forwardly into the body of the fuel. The air passing upward towards the rear opening 2 of the bottom grate impinges against the beveled face 10, and is directed towards the front of the fire box. This forward tendency of the upward current of air, after the latter enters the fire box, is counteracted by the draft through the chimney, which draws the current upwardly and rearwardly over the top of the oven. The heat in the fire box, therefore, cannot escape to the stove pipe, as quickly as when the draft through the fire box enters the same at the front and sweeps across the top of the fire box. Also when the air enters the fire box at the front, it passes across the top of the fire and is interposed between the fire and the top of the stove and thereby lessens the heating effect of the same at a point directly above the fire.

The grate may be provided at the rear edges of its end portions and at the front edge of the rear opening 2 with substantially V-shaped grooves 11 and 12, adapted to enable portions of the grate to be readily broken off with a cold chisel, or other tool, for reducing the size of the grate to fit different sizes of stoves, and also to increase the size of the rear opening to provide the desired amount of draft through the back of the bottom grate. The front grate 13, which is constructed separate from the bottom grate, is vertical, and is provided with upper slots or openings 14 and with lower openings or bifurcations 15, which are controlled by upper and lower sliding doors or dampers 16 and 17. The vertical front grate, which is arranged in suitable grooves or ways 18 of the side walls of the stove, is provided at the upper and lower portions of the slots or openings 14 with horizontally alined guides 19 and 20, which receive the upper slidable door or damper 16. The upper slidable door or damper, which is provided with slots or openings to correspond with those of the grate, is slidable to cover and uncover the same. The guides 19 and 20, which are approximately L-shaped to embrace the upper and lower edges of the slidable door or damper 16, may be mounted on the front grate in any desired manner, either by being formed integral with the same, or by providing threaded shanks or bolts. The lower guides 20 are provided with depending bills or engaging portions 21, which engage slots 22 of the lower slidable damper 17. The slots 22 are arranged adjacent to the upper edge of the lower slidable damper to enable the top portion of the said door or damper 17, contiguous to the hooks of the lower guides 20, to be arranged therein, and the slidable door or damper is provided with openings adapted to register with the lower slots or bifurcations 15 of the front grate. By means of the slidable doors or dampers, the openings of the front vertical grate may be covered or uncovered to a greater or less extent, as desired. The engaged portions 21$^a$ of the lower slidable door or damper are round to form pintles to permit the lower slidable door to be readily swung upwardly. This will enable a poker to be inserted through the front grate into the fire box without sliding the lower damper. The engaged portions, however, can be made of non-circular form, if desired. The stove is also provided at the front grate with a hinged door 23 of the ordinary construction.

The hearth 24 of the stove is pivoted contiguous to its inner edge, and it carries pivots or pintles 25, which are arranged in grooves 26 in the side portions of the stove. The grooves 26 extend to the front of the stove and enable the hearth to be drawn outward and swung downward to afford access to the ash pit for the removal of an ash pan 27. The front portions 28 of the grooves are curved downward to permit the hearth to be arranged exteriorly of the stove at the front thereof. The hearth is provided at its ends with depending substantially triangular wings 29, located at opposite sides of the stove and adapted, when the hearth is swung upward, as illustrated in dotted lines in Fig. 2 of the drawing, to coöperate with the same to form an air chute or conduit for conducting the air into the stove to produce an upward draft through the opening 2 of the bottom grate. The hearth is adjusted vertically by means of a screw 30, mounted in a threaded perforation of a horizontal enlargement or lug 31 and engaging the lower face of the hearth contiguous to the downwardly bent portion or frame thereof. By this construction a draft through the bottom of the stove to the desired extent may be afforded.

The stove is provided at opposite sides with air inlet openings 32, which are controlled by means of pivoted wickets 33, but the stove is preferably provided with horizontally alined guides 34, which can be cast with the sides of the stoves for enabling a sliding door or damper to be employed for controlling the side openings. The air may be admitted at either side of the stove by opening either one of the wickets 33, and an excess of heat may be afforded at either side of the stove by this means, the greater amount of heat being at the side contiguous to the closed wicket.

It will be seen that the improvements herein shown and described enable the draft and the heating capacity of a stove to be completely controlled by the operator, and it will also be seen that the improvements will effect a material saving in the fuel, and will afford a slow fire even when there is a straight draft from the fire box to the stove pipe.

When the dampers are set so that the heat does not pass around the oven, the stove is adapted for summer use, and the draft is then mainly through the bottom of the stove, the front grate being closed. The pivoted hearth will then enable the fire to be controlled, and may be opened to a greater or less extent to afford a slow or more or less quick fire.

Having thus fully described my invention, what I claim as new and desire to secure by Letters Patent, is:—

1. A stove provided with a bottom grate having an imperforate front body portion and provided with a rear opening for causing an upward draft at the rear wall of the fire box, said bottom grate being also provided with means located at the back of the said opening for throwing the air forwardly.

2. A stove having a bottom grate provided with an imperforate front body portion and having a rear opening, said grate being provided at the back of the opening with a depending deflecting portion having an inclined front edge.

3. A stove provided with a front grate having upper and lower slots or openings, and upper and lower slidable doors or dampers mounted on the front grate and provided with slots or openings corresponding with those of the said grate.

4. A stove provided with a front grate having slots or openings, and a door or damper slidably connected with the front grate and hinged, whereby the slidable door or damper is also adapted to swing outwardly and inwardly.

5. A stove having a front grate provided with upper and lower slots or openings, upper and lower horizontally alined guides, the lower guides being provided with depending hooks, an upper door or damper slidable in the guides, and a lower slidable door or damper provided with slots and receiving the hooks of the lower guides.

6. A stove having a front grate provided with upper and lower slots or openings, upper and lower horizontally alined guides, the lower guides being provided with depending hooks, an upper door or damper slidable in the guides, and a lower slidable door or damper provided with slots and receiving the hooks of the lower guides, said lower door or damper having its engaged portions round to form pintles, whereby the lower door or damper is also hinged to the front grate.

7. A stove provided with a bottom grate having an imperforate front body portion and provided with a rear opening for causing an upward draft at the rear wall of the fire box, and a depending deflector consisting of a bar arranged at the lower face of the grate and located at the back of the opening and connecting the end portions of the grate and adapted to throw the air forwardly.

8. A stove provided with a bottom grate having an imperforate front body portion and provided with a rear opening for causing an upward draft at the rear wall of the fire box, and a deflector consisting of a bar arranged at the back of the grate and extending along and below the opening and connecting the end portions of the grate, said deflector being provided with upwardly and forwardly inclined front edges and adapted to throw the air forwardly.

In testimony, that I claim the foregoing as my own, I have hereto affixed my signature in the presence of two witnesses.

JOSEPH J. SHIMEK.

Witnesses:
   JOHN H. SIGGERS,
   S. GEORGE TATE.